Feb. 14, 1956 — J. J. MANDEL — 2,734,300
FISHING APPARATUS
Filed Aug. 29, 1952 — 3 Sheets-Sheet 1
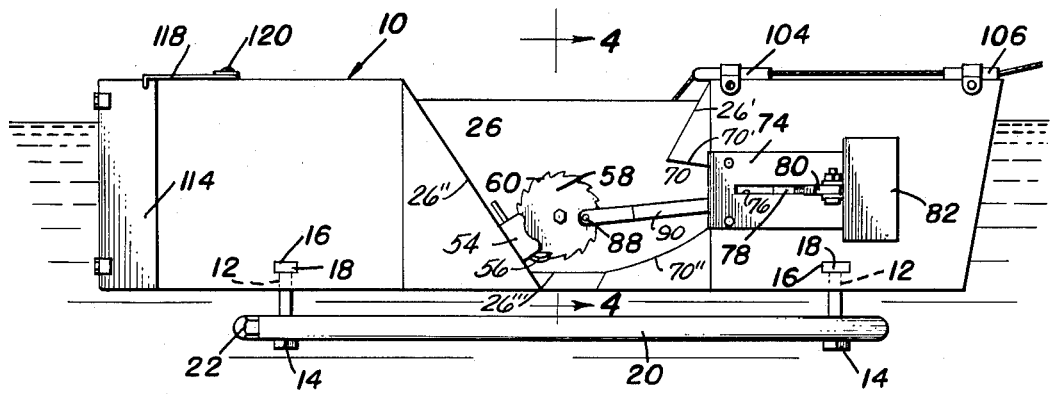
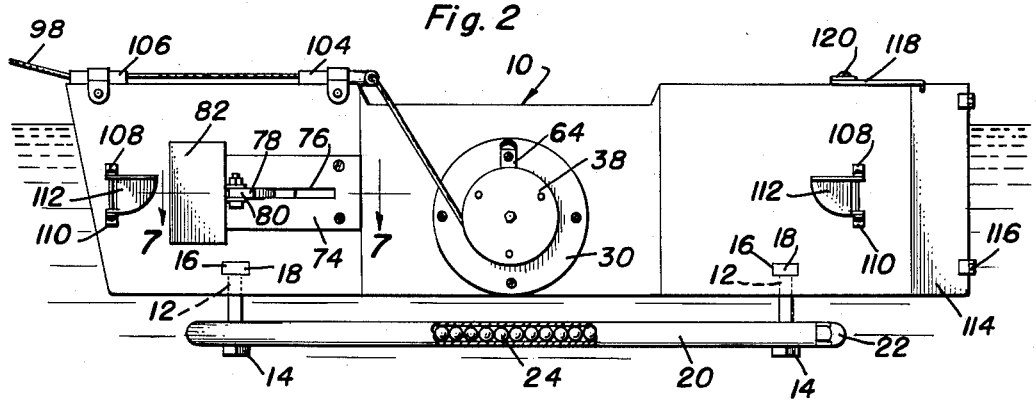
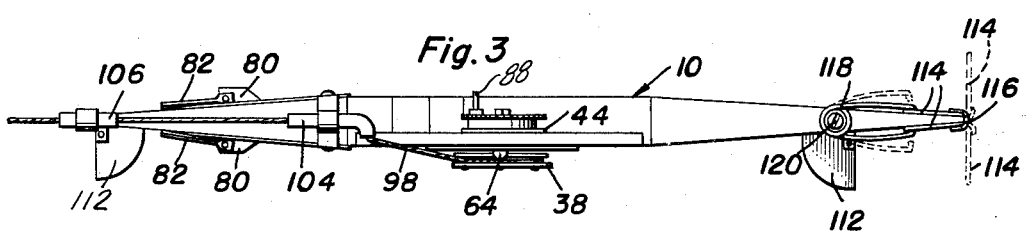
Jacob J. Mandel
INVENTOR.

Feb. 14, 1956  J. J. MANDEL  2,734,300
FISHING APPARATUS
Filed Aug. 29, 1952  3 Sheets-Sheet 2
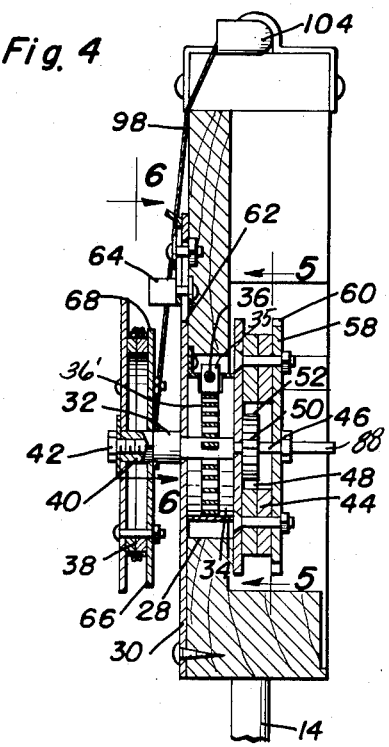
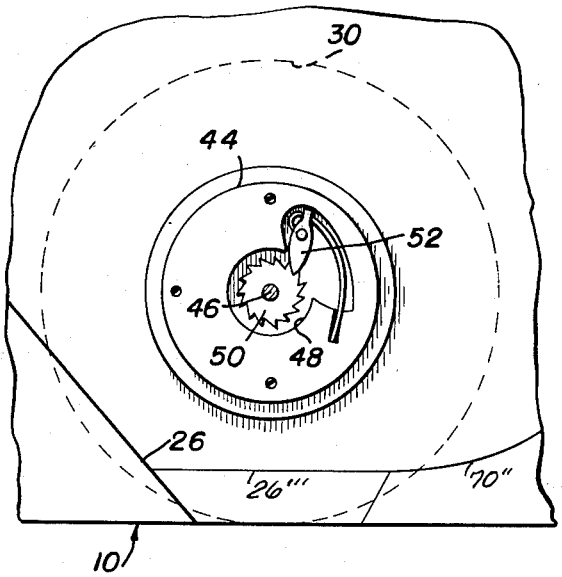
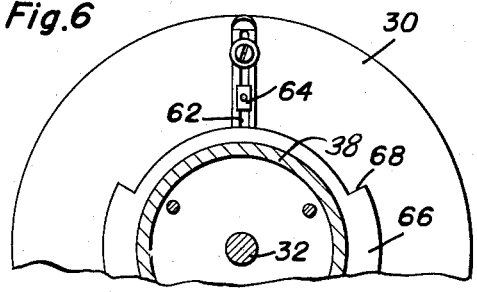
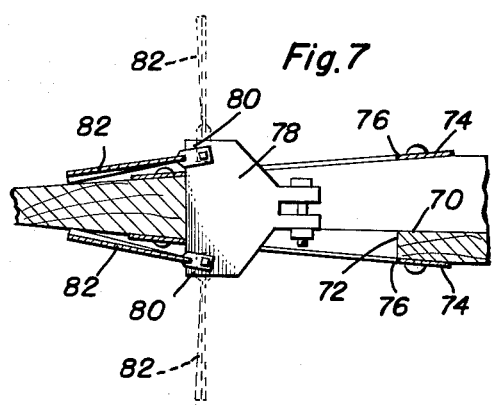
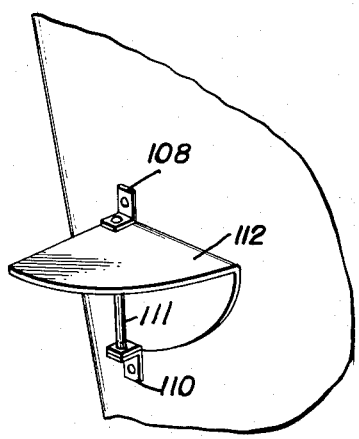
Jacob J. Mandel
INVENTOR.

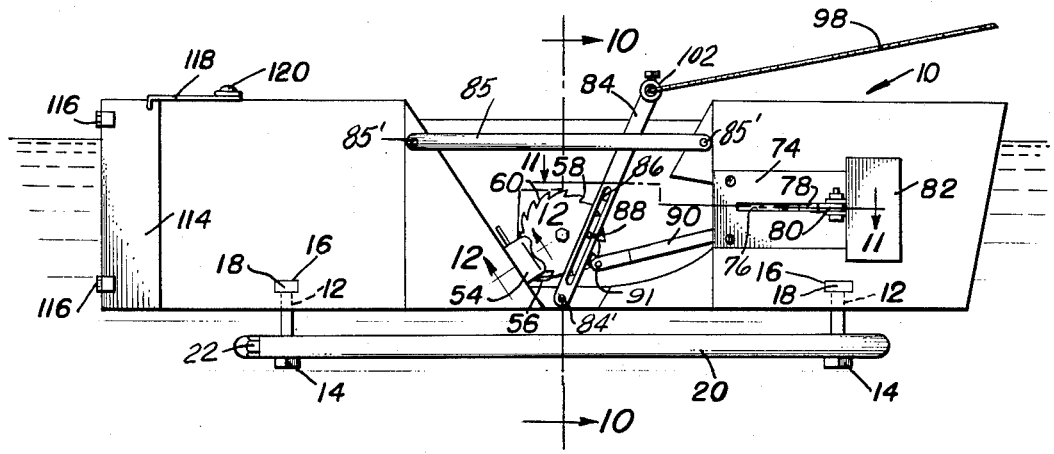
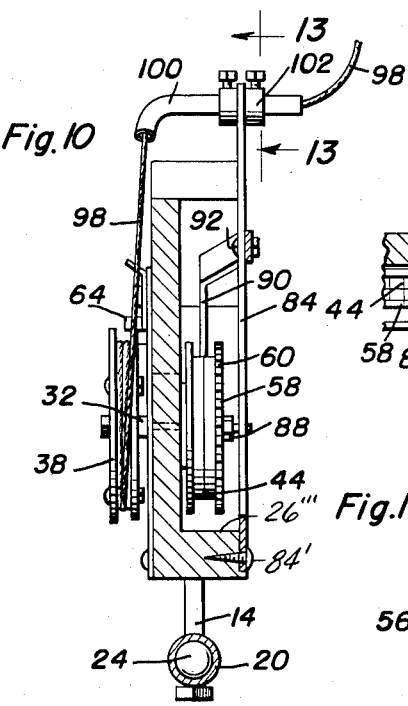
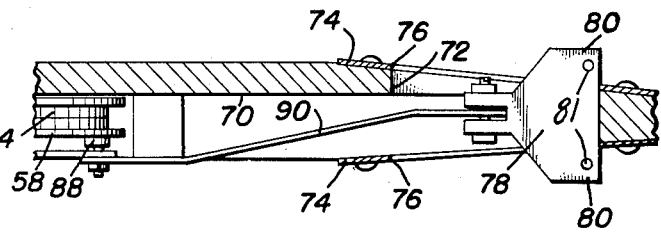
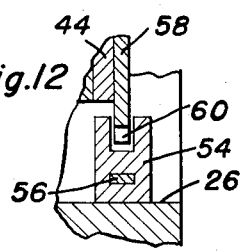
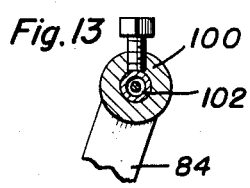

United States Patent Office 2,734,300
Patented Feb. 14, 1956

2,734,300

FISHING APPARATUS

Jacob J. Mandel, Bynum, Mont.

Application August 29, 1952, Serial No. 307,073

5 Claims. (Cl. 43—26.1)

This invention relates to new and useful improvements in fishing apparatus and the primary object of the present invention is to provide a trolling device that may be directed into the water from the shore and whereby a person standing on the shore may control the movement of the device through the water.

Another important object of the present invention is to provide a fishing device so constructed as to permit various modes of operation of the same with the operator controlling the movement of the device from the shore.

A further object of the present invention is to provide a trolling device involving a spring-tensioned shaft operatively connected to a pulley having a line with hooks attached thereto, whereby rotation of the shaft in one direction will unwind the line and drop the hooks into the water.

A still further aim of the present invention is to provide a trolling device of the aforementioned character that is extremely simple and practical in construction, strong and reliable in use, efficient and durable in operation, inexpensive to manufacture, assemble and maintain, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, in which:

Figure 1 is a side elevational view of the present invention assembled for use in one mode of operation and showing line guides as utilized in this mode of operation;

Figure 2 is a side elevational view taken from the opposite side of Figure 1 and with parts of the balancing tube broken away;

Figure 3 is a top plan view of Figure 2;

Figure 4 is an enlarged vertical sectional view taken substantially on the plane of section line 4—4 of Figure 1;

Figure 5 is an enlarged detailed vertical sectional view taken substantially on the plane of section line 5—5 of Figure 4;

Figure 6 is an enlarged detailed vertical sectional view taken substantially on the plane of section line 6—6 of Figure 4;

Figure 7 is an enlarged longitudinal horizontal sectional view taken substantially on the plane of section line 7—7 of Figure 2;

Figure 8 is a fragmentary perspective view of one end of Figure 2 to illustrate the body directing members used in the invention;

Figure 9 is a view similar to Figure 1, but showing the device assembled for use in another mode of operation with the slidable and pivotal flaps connected to the leader holding pulley and showing another line guide utilized in this mode of operation, the line guides of Figure 1 being omitted for purposes of clarity;

Figure 10 is an enlarged vertical sectional view taken substantially on the plane of section line 10—10 of Figure 9;

Figure 11 is an enlarged fragmentary longitudinal sectional view taken substantially on the plane of section line 11—11 of Figure 9;

Figure 12 is an enlarged detailed sectional view taken substantially on the plane of section line 12—12 of Figure 9;

Figure 13 is an enlarged detailed vertical sectional view taken substantially on the plane of section line 13—13 of Figure 10;

Figure 14 is a diagrammatic view showing the invention in use.

Referring now to the drawings in detail, wherein for the purpose of illustration, there is disclosed a preferred embodiment of the present invention, the numeral 10 represents an elongated float member or body formed of a central portion and opposite end portions. The central portion is provided with parallel sides and each end portion is provided with side walls which converge toward each other in a direction away from said central portion. The lower edge of each end portion is provided with a vertical aperture 12 that receives the upper threaded end of a headed bolt 14. Slots 16 are provided on one side of the end portions of the member 10 and intersect the apertures 12. Nuts 18 in the slots 16 receivably engage the upper ends of the bolts 14. The bolts 14 extend upwardly through transverse apertures in the ends of a tube 20 having one end permanently closed and its other end closed by a removable plug 22. A plurality of metallic balls 24 are inserted in the tube 20 to provide ballast so that the body member 10 will be held against over-tipping.

As best shown in Figure 1, one side of the central portion of the member 10 is provided with a recess 26, defined by vertically sloping front and rear walls 26' and 26" and a lower horizontal double wall 26'". A recess 70 of the same depth as recess 26 extends from one end of the recess 26, and is defined by upper and lower walls 70' and 70", wall 70' intersecting the wall 26' of the recess 26. An opening 28 as seen in Figure 4, extending from one side of the central portion of the member 10 communicates with the recess 26. A mounting plate 30 is secured to the member 10 over opening 28 and rotatably supports a shaft 32 that is disposeed transversely of member 10. A spring housing 34, within opening 28, is secured to the plate 30 and houses a spiral spring 36' having its outer end 35 bent outwardly and secured to the housing 34 as by a suitable fastener 36 and its inner convolution secured to the shaft 32.

The central multi-sided aperture in pulley 38 receives the outer multi-sided end of the shaft 32 and pulley 38 is secured to the end 40 of said shaft by a fastener 42. A disc assembly 44 is freely journaled on the reduced end 46 of shaft 32. Disc assembly 44 is formed with a recess 48 that accommodates a ratchet 50 fixed to the end 46 of said shaft. A spring pressed pawl 52 (Figure 5) pivotally mounted on the wall of recess 48 will engage ratchet 50 to provide rotation of disc 44 with shaft 32 in one direction only the purpose of which will be later described.

Means is provided for holding the disc assembly 44 against rotation when the shaft 32 is rotated in the opposite direction to permit pawl 52 to ratchet past the ratchet 50. This means comprises a block 54 shown in Figs. 9 and 12 secured in recess 26 which carries a spring arm 56. The outer flange or plate 58 of disc assembly 44 is provided with circumferentially spaced teeth 60 for engaging the arm 56. The purpose for providing this means will be later described.

In order to limit the extent of rotary movement of the pulley 38, the plate 30 is formed with a slot 62 disposed radially of shaft 32 which slidably and adjustably receives a lug or stop 64 (Fig. 6). The inner flange or plate 66 of pulley 38 is provided with a peripheral notch 68 that will receive the lug 64 when the latter is positioned at the inner part of slot 62.

The recess 70 above described communicates with a transverse horizontal slot 72 extending through one end portion of the member 10. Cover and guide plates 74 are secured to the converging sides of this end of the body member over the transverse horizontal slots 72, one plate 74 also covering a portion of the recess 70 as best illustrated in Figure 11. The plates 74 are formed with longitudinal slots 76 registering with the slots 72 in the member 10 and a slide 78 is mounted in the slot 72, the slide having ear portions 80 which extend outwardly through slots 76 in the cover and guide plates 74. The ear portions 80 are provided with apertures which pivotally support vertical flaps 82. Flaps 82 are therefore movable longitudinally of the member 10 upon sliding movement of slides 78 within the slots 72 and additionally can pivot toward and away from the converging side walls of the body member by reason of their pivotal mounting on slides 78, this movement being utilized in one of the modes of operation of the fishing device as will be now described.

As best shown in Figures 9–11, wherein the fishing device is shown with the components utilized in the above-mentioned mode of operation, a vertically swingable arm 84 is detachably pivoted to the side of the member 10 beneath the lower horizontal wall 26''' of the recess 26, as by a suitable threaded fastener 84'. The arm 84 extends upwardly adjacent the outer flange 58 of disc assembly 44 and above the upper surface of the member 10. A horizontal bar 85 is disposed across the upper end of the recess 26 and is detachably secured to the side of member 10 by fasteners 85', as indicated in Figure 9, to retain the upper end of arm 84 within the recess. Arm 84 has a longitudinal slot 86 therein that slidably receives the reduced end of a pin 88 secured eccentrically to the outer flange 58 of disc assembly 44. One end of a pitman or link 90 is pivotally secured between a bifurcated forward portion of slide 78, as seen in Figure 11. The link 90 is suitably offset so that the forward end having an aperture 91 therein lies adjacent the side of member 10 and in approximately the same plane as arm 84. The link 90 is provided with a detachable fastener 92 that is slidably received in an upper portion of the slot 86 of arm 84, above the position of the pin 88 in the slot 86, as best seen in Figure 10. In Figure 9, the link 90 is shown in its disconnected, inoperative position wherein the forward end drops downwardly adjacent the lower wall 70'' of the recess 70, to illustrate the manner in which the flaps 82 are rendered inoperative, although it will be understood that the link 90 is to be slidably connected to the arm 84 by the fastener 92 above pin 88 in this figure for the mode of operation affected by the organization of elements in Figures 9–11.

When the link 90 is connected to the slotted arm 84, it will be apparent that rotation of disc assembly 44 in the direction permitted by teeth 60 and spring arm 56, causes swinging movement of arm 84 about its pivot 84', this movement in turn imparting a longitudinal sliding movement to the slide 78 by reason of the link 90. The fastener 92 pivotally connects the link 90 to the arm 84 and is located above the pin 88 in the slot 86 at all times during rotation of disc 44 and therefore does not interfere with movement of pin 88.

In the above mode of operation, a pulling line 98 supports vertical spaced leaders 94 carrying hooks 96 forwardly of the body member. The end of the pulling line 98 passes through a guide 100 secured in a sleeve 102 mounted at the upper end of arm 84 and is thence wound about and is suitably attached to the pulley 38. With the member afloat in a body of water, a sharp pull by the operator at the remote end of pulling line 98 results in rotation of the pulley 38 and tensioning of the spring 36' within the spring housing 34, the lug or stop 64 being placed in its upper position where it does not prevent complete rotation of pulley 38. The rotation of pulley 38 during this sharp pull is in such a direction as to permit ratchet 50 to move idly with respect to pawl 52 carried by disc assembly 44, whereby the disc assembly 44 is not rotated. The disc assembly 44 is further held stationary by engagement of teeth 60 with spring arm 56. However, when the pull on line 98 is relaxed, the tension spring 36' in spring housing 34 unwinds and rotates shaft 32 and ratchet 50 in the opposite direction, resulting in driving engagement between ratchet 50 and pawl 52, whereby the disc assembly 44 is driven in a counter-clockwise direction as viewed in Figure 9, this rotation causing idle movement between teeth 60 and disc assembly 44 and spring arm 56. Rotation of disc assembly 44 results in forward and rearward movement of slide 78 as described above. Forward and rearward movement of the slide will tend to pivotally displace the flaps 82 from the solid line position in Fig. 7, to that shown dotted therein due to the reaction of the flap with the water. Movement of the device through the water will tend to increase or decrease such pivotal movement. At the same time the pivotal movement will tend to place an unsteady drag on the movement of the device which will tend to alternately increase and decrease the drag thereby imparting an irregular action thereto. Additionally, the arm 84 is swung forwardly and rearwardly during the above operation and tends to alternately slacken and tighten the line 98, resulting in a bobbing movement of the leaders 94 and hooks 96.

As shown in Figure 1, a second mode of operation of the fishing device is obtained by removal of the arm 84 and bar 85. The pulling line 98 is then threaded through guides 104 and 106 secured to the upward forward portion of member 10, it being understood that these guides remain on the member 10 during all types of operation, even though they are not shown in Figures 9–11 to simplify these figures. Pulling line 98 is then wound about and secured to pulley 38, as best indicated in Figures 2 and 3. As shown in Figure 1, link 90 may then be attached to pin 88, being retained thereon by any suitable fastener, not shown. With the lug or stop 64 in its upper position, a sharp pull on line 98 results in operation of flaps 82 in a manner similar to that described above. However, since the arm 84 and line guide 100 are not utilized, leaders 94 are not given a bobbing action in this mode of operation except that imparted by the irregular motion of the body 10.

Alternatively, the link 90 may be detached from pin 88, then resting in the position shown in Figure 9, and the flaps 82 folded against the sides of member 10. The lug or stop 64 is then moved to its lower position where it engages the notch 68 to limit movement of pulley 38. The fishing device is then capable of steady towing movement by means of pulling line 98. The extent of notch 68 and pulley flange 66 provides limited movement of the pulley 38 and by reason of the spring and spring housing 34, any variation in the steady pull on line 98 results in limited winding or unwinding of the spring, rather than being transmitted directly to the member 10, thereby resulting in smooth, even movement of member 10 in the water.

In the last mentioned mode of operation, speed and direction of the body member may be further controlled by pivoted angle members 112 as shown in Figs. 2 and 8. These members include a vertical portion and an upper horizontal portion, and are pivoted between brackets 108 and 110 mounted on one side of the member 10 adjacent the forward and rear ends thereof, as by pivot pins 111. One or both of these angle members can be selectively positioned so that the vertical portion extends outwardly of the body member, thereby causing an increased drag on one side of the member 10, which tends to move the member 10 at an angle to the direction of the pulling line 98. To control the speed of the member 10, a pair of horizontally swingable plates 114 are hinged to the rear end of the body 10, as at 116, and are retained against the sides of the body 10 in inoperative position by a U-shaped spring 118. The spring 118 is secured to the member 10 by a suitable fastener 120 in such a manner that the legs of the spring engage the upper forward edges of the plates 114. Upon lifting of the free ends of the legs of spring 118, the plates 114 are released for outward swinging movement to the dotted line position of Figure 3, when towed by the pulling line 98. It will be understood that angle members 112 and plates 114 remain on the fishing device during all modes of operation, and are rendered selectively operative or inoperative as desired.

Having described my invention, what is claimed as new is:

1. A fishing device comprising an elongated float member, means carried by the float member tending to prevent the float member from over-tipping, a transverse spring tensioned shaft rotatably supported on the float member, a pulley secured on said shaft for rotation therewith, a disc journaled on the shaft, interlocking means between the disc and the shaft whereby the disc can rotate with the shaft in one direction, said shaft being tensioned by its spring as the pulley is rotated in one direction and said pulley and disc rotating as a unit when the pulley is released and means for rotating said pulley.

2. A fishing device comprising an elongated float member, means carried by the float member tending to prevent the float member from over-tipping, a transverse spring tensioned shaft rotatably supported on the float member, a pulley secured on said shaft for rotation therewith, a disc journaled on the shaft, interlocking means between the disc and the shaft whereby the disc can rotate with the shaft in one direction, said shaft being tensioned by its spring as the pulley is rotated in one direction and said pulley and disc rotating as a unit when the pulley is released, said means tending to prevent the float member from over-tipping including a weight extending under the float member and parallel thereto and means for rotating said pulley.

3. A fishing device comprising a float member, a shaft rotatably supported on the member, a spiral spring secured at one end to the shaft and at its other end to the member and adapted to rotate the shaft after the spring has been tensioned, a pulley connected to one end of the shaft for rotation with the shaft at all times, a line wound on the pulley which when pulled will rotate the pulley and tension the shaft, a disc journaled on the shaft, means engaging the disc to permit rotation of the disc in but one direction, means connecting the shaft to the disc whereby the disc may rotate with the shaft in one direction, and hook supporting lines attached to the first named line.

4. A fishing device comprising an elongated float member having front and rear ends, a spring tensioned shaft rotatably supported by the member, a pulley secured to the shaft adapted to be rotated therewith, a pulling line attached to and wound about said pulley adapted to rotate the shaft and tension the spring on the shaft, a disc journaled on the shaft, means connecting the disc to the shaft whereby the shaft and disc may rotate as a unit in one direction, means engaging the disc to hold the same against rotation during rotation of the shaft in an opposite direction, and hook-supporting lines attached to the pulling line, said pulling line being adapted to be pulled to tension the shaft and then slackened to permit the pulley and disc to rotate together to unwind the pulling line from the pulley, said float member having the rear end thereof provided with an opening therein, guide plates secured to the float member and having longitudinal slots in registry with each other, a slide received in said slots, a pair of horizontally swingable flaps pivoted to the slide, and means operatively connecting said slide to the disc for imparting sliding movement to the slide during rotation of the pulley.

5. A fishing device comprising an elongated float member having front and rear ends, a spring tensioned shaft rotatably supported by the member, a pulley secured to the shaft for rotation therewith, a pulling line attached to and wound about said pulley adapted to rotate the shaft and tension the spring of the shaft, a disc journaled on the shaft, means connecting the disc to the shaft whereby the shaft and disc may rotate as a unit in one direction, means engaging the disc to hold the same against rotation during rotation of the shaft in an opposite direction, and hook-supporting lines attached to the pulling line, said pulling line being adapted to be pulled to tension the shaft and then slackened to permit the pulley and disc to rotate together to unwind the pulling line from the pulley, said float member having the rear end thereof provided with an opening therein, guide plates secured to the float member and having longitudinal slots in registry with each other, a slide received in said slots, a pair of horizontally swingable flaps pivoted to the slide, a pin secured eccentrically to the disc, an angularly oscillating arm having a longitudinal slot adapted to receive the pin, and a pitman pivotally attached to the arm and to the slide.

References Cited in the file of this patent

UNITED STATES PATENTS

| | | |
|---|---|---|
| 788,047 | Holz et al. | Apr. 25, 1905 |
| 1,858,550 | Kahle | May 17, 1932 |
| 2,030,000 | Harrington | Feb. 4, 1936 |
| 2,600,002 | Klein | June 10, 1952 |